US008621282B1

(12) United States Patent
Mixter et al.

(10) Patent No.: US 8,621,282 B1
(45) Date of Patent: Dec. 31, 2013

(54) CRASH DATA HANDLING

(75) Inventors: Kenneth E. Mixter, Mountain View, CA (US); Darin S. Petkov, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 280 days.

(21) Appl. No.: 13/111,909

(22) Filed: May 19, 2011

(51) Int. Cl.
*G06F 11/00* (2006.01)

(52) U.S. Cl.
USPC .......................................... 714/38.11; 726/26

(58) Field of Classification Search
USPC ..................... 714/38.1, 38.11; 726/26, 27, 29
See application file for complete search history.

(56) References Cited

U.S. PATENT DOCUMENTS

| | | | |
|---|---|---|---|
| 7,398,430 B2 | 7/2008 | Wang et al. | |
| 2002/0087860 A1* | 7/2002 | Kravitz | 713/168 |
| 2006/0120526 A1* | 6/2006 | Boucher et al. | 380/247 |
| 2008/0126301 A1* | 5/2008 | Bank et al. | 707/3 |
| 2008/0195836 A1* | 8/2008 | Muppirala et al. | 711/173 |
| 2009/0024820 A1 | 1/2009 | Ponnuswamy | |
| 2009/0254999 A1* | 10/2009 | Julin et al. | 726/28 |
| 2009/0282036 A1* | 11/2009 | Fedtke | 707/6 |
| 2011/0040808 A1* | 2/2011 | Joy et al. | 707/812 |

OTHER PUBLICATIONS http://msdn.microsoft.com/en-us/library/office/bb219076(v=office.12).aspx#MicrosoftErrorReporting; "How to: Configure Microsoft Error Reporting;" link active as of Apr. 17, 2013; content published online on Dec. 2006 by Microsoft Corporation; pp. 1-55.*
Broadwell, Pete et al.; "Scrash: A System for Generating Secure Crash Information;" Proceedings of the 12th USENIX Security Symposium; Aug. 4-8, 2003; Washingtion, D.C., USA; pp. 273-284.*

* cited by examiner

*Primary Examiner* — Scott Baderman
*Assistant Examiner* — Joseph Kudirka
(74) *Attorney, Agent, or Firm* — McDermott Will & Emery LLP

(57) ABSTRACT

Systems and methods for handling a crash of a process running on an operating system (OS) of a client are provided. In some aspects, a method includes generating crash data based on a dump file associated with the crash of the process. The crash data is associated with a first user logged in to the OS at the time of the crash. The method also includes storing the crash data in a cryptographically secure location on the client such that the crash data persists across reboot of the client. The method also includes preventing the crash data from being sent to an analysis server when the first user is not logged in to the OS.

28 Claims, 4 Drawing Sheets

CRASH DATA HANDLING

FIELD

The subject technology generally relates to crash handling of a process and, in particular, relates to systems and methods for handling a crash of a process running on an operating system (OS) of a client.

BACKGROUND

When a process running on an operating system of a client crashes, a dump file may be generated to capture the operating state of the client at the time of the crash. The dump file contains information that is useful for diagnosing the crash. An analysis server may compare this information to similar crashes of other clients in order to diagnose the crash of the current client. However, the dump file is typically a very large file, which can range from several hundred megabytes to several gigabytes. It may therefore be impractical to send such a large file from the client to the analysis server. Furthermore, because the dump file captures the operating state of the client at the time of the crash, it is desirable to protect the privacy of the user using the client at the time of the crash and not send personal identifiable information (PIT) to the analysis server.

SUMMARY

According to various aspects of the subject technology, a method for handling a crash of a process running on an operating system (OS) of a client is provided. The method comprises generating crash data based on a dump file associated with the crash of the process. The crash data is associated with a first user logged in to the OS at the time of the crash. The method also comprises storing the crash data in a cryptographically secure location on the client such that the crash data persists across reboot of the client. The method also comprises preventing the crash data from being sent to an analysis server when the first user is not logged in to the OS.

According to various aspects of the subject technology, a system for handling a crash of a process running on an OS of a client is provided. The system comprises a crash handler module configured to generate crash data based on a dump file associated with the crash of the process. The crash data is associated with a first user logged in to the OS at the time of the crash. The crash handler module is further configured to store the crash data in a cryptographically secure location on the client such that the crash data persists across reboot of the client. The crash handler module is further configured to prevent the crash data from being sent to an analysis server when the first user is not logged in to the OS.

According to various aspects of the subject technology, a machine-readable storage medium is provided. The machine-readable storage medium is encoded with instructions executable by a processing system to perform a method for handling a crash of a process running on an OS of a client. The instructions comprise code for generating crash data based on a dump file associated with the crash of the process. The crash data is associated with a first user logged in to the OS at the time of the crash. The instructions also comprise code for storing the crash data in a cryptographically secure location on the client such that the crash data persists across reboot of the client. The instructions also comprise code for preventing the crash data from being sent to an analysis server when the first user is not logged in to the OS.

According to various aspects of the subject technology, a method for handling a crash of a process running on an OS of a client is provided. The method comprises extracting crash data from a dump file associated with the crash of the process. The crash data is associated with a first user logged in to the OS at the time of the crash. Only non-personal identifiable information of the first user is extracted from the dump file. The method also comprises storing the crash data in a cryptographically secure location on the client such that the crash data persists across reboot of the client. The method also comprises preventing the crash data from being sent to an analysis server when the first user is not logged in to the OS, and when a second user different from the first user is logged in to the OS and connection to the analysis server is available.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

Figure 1:
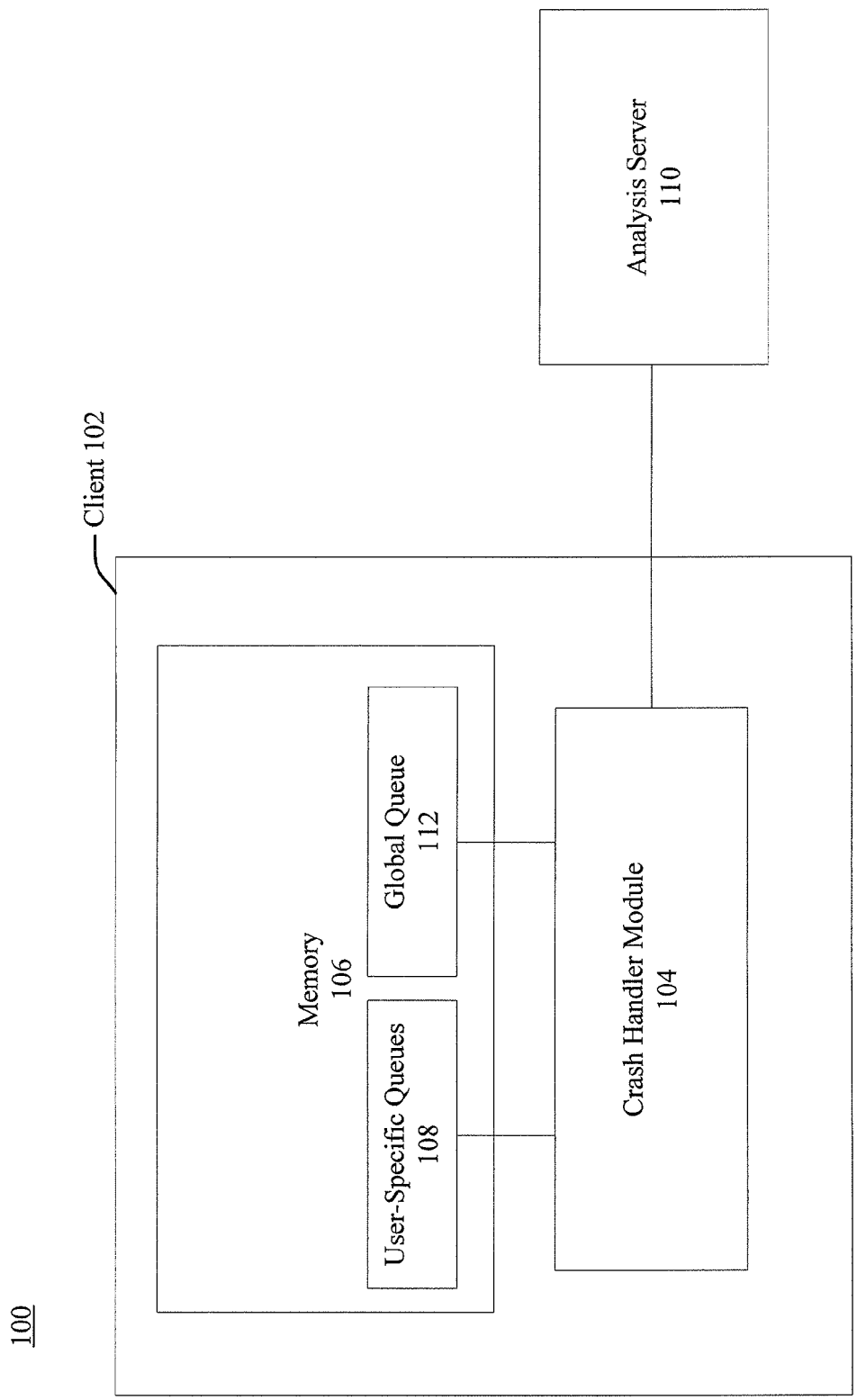
FIG. 1 illustrates an example of a system for handling a crash of a process running on an operating system (OS) of a client, in accordance with various aspects of the subject technology.

FIG. 1 illustrates an example of a system 100 for handling a crash of a process running on an operating system (OS) of a client 102, in accordance with various aspects of the subject technology. Client 102 may be a desktop computer, a laptop, a notebook, a netbook, a smartphone, or any other suitable computing device. System 100 comprises crash handler module 104 that is configured to handle the crash. In some aspects, crash handler module 104 may handle the crash by extracting crash data from the dump file, collecting other suitable information of the OS and/or the process to add to the crash data, placing the crash data in queues 108 or 112 (which are a portion of memory 106 and include items to be sent to analysis server 110), and sending the crash data to analysis server 110. In some aspects, crash handler module 104 may store the crash data in memory 106, which may comprise non-volatile memory. In some aspects, crash handler module 104 may require consent from a user before reporting the crash to the analysis server 110. For example, after the crash, system 100 may prompt the user for consent to report the crash and may report the crash if the user consents in response (e.g., by pressing a key indicating consent).

Figure 2:
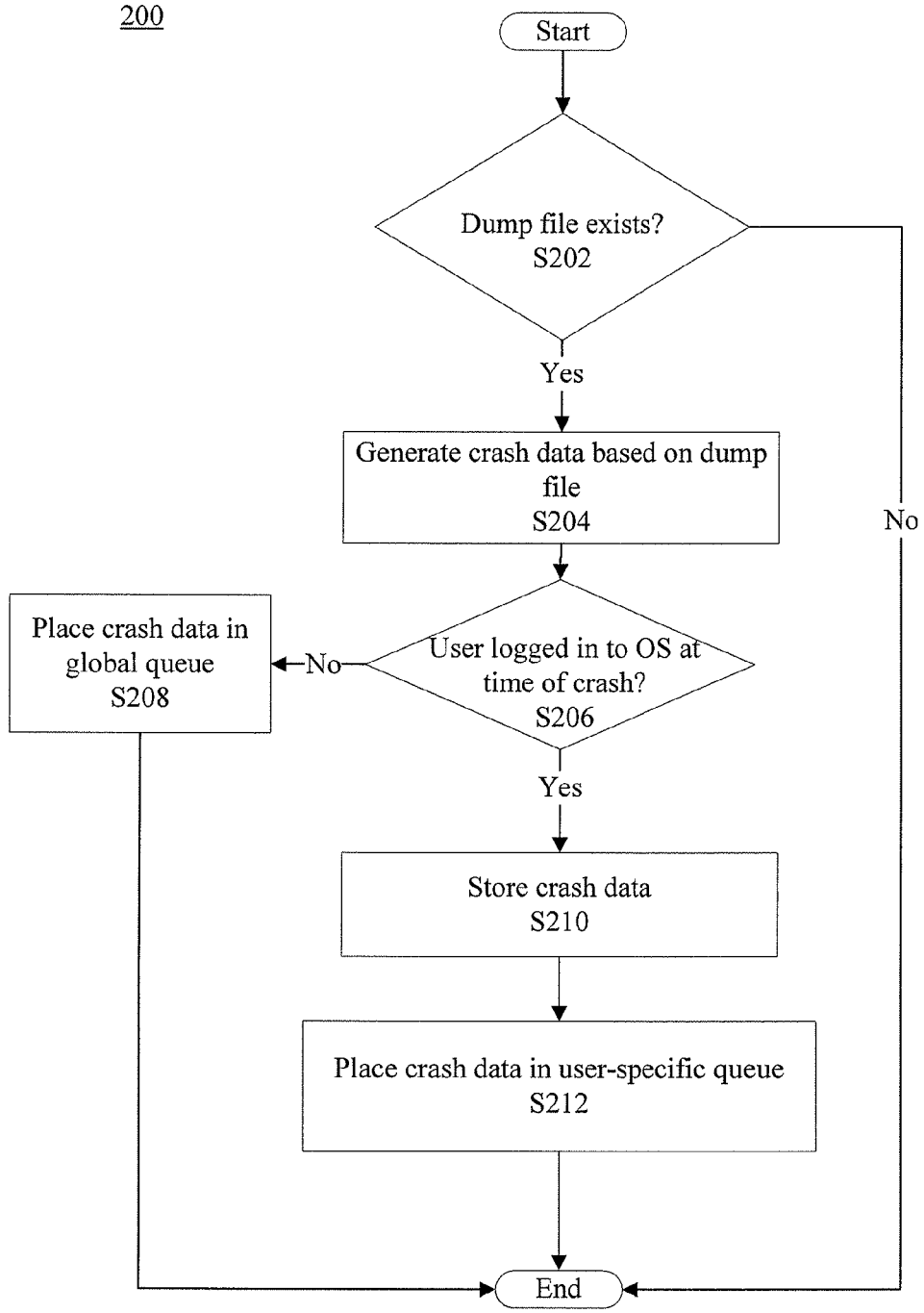
FIG. 2 illustrates an example of a method for handling a crash of a process running on an OS of a client, in accordance with various aspects of the subject technology.

FIG. 2 illustrates an example of a method 200 for handling a crash of a process running on an OS of client 102, in accordance with various aspects of the subject technology. When the crash occurs, a dump file may be generated to capture the operating state of client 102 at the time of the crash. For example, the kernel of client 102 may identify the crashed process and initiate a full core dump of the process to generate the dump file. This dump file may be provided to crash handler module 104. If the dump file exists, then crash handler module 104 may generate crash data based on the dump file according to S202 and S204. Otherwise, method 200 may terminate.

The crash data is associated with a user logged in to the OS at the time of the crash. For example, first crash data may be used to refer to the crash data that is associated with a first user that was logged in to the OS at the time of the crash. In some aspects, the crash data comprises at least one of state information of the OS at the time of the crash, state information of the process at the time of the crash, stack trace information, application log information associated with the crash, and other suitable information that could be used by analysis server 110 to diagnose the crash. For example, the crash data may contain enough information to provide a stack trace of all threads (associated with the crashed process) running at the time of the crash. According to certain aspects, crash handler module 104 may generate the crash data by extracting the crash data from the dump file. Because the dump file may be a very large file, crash handler module 104 may extract only the information that is necessary for analysis server 110 to diagnose the crash. In this sense, the crash data may be considered a compressed or converted version of the dump file. In some aspects, a size of the crash data is less than a size of the dump file. For example, the size of the crash data may be less than about 10%, 1%, 0.1%, 0.01%, or 0.001% of the size of the dump file. However, the size of the crash data may be other suitable sizes in relation to the dump file. Converting the dump file into the crash data may involve reading the contents of the dump file to determine the number of threads associated with the crashed process, the register sets of all threads, and the contents of the stacks of the threads.

Because the dump file captures the operating state of the client at the time of the crash, the dump file may contain personal identifiable information (PII) that may reveal the identity of a user logged in to the OS at the time of the crash. For example, this PII may comprise at least one of email address information, internet protocol address information, media access control information, recent web page information, screen capture information, and other information that may reveal the identity of a user. In some cases, the PII may be from a kernel core file (the kernel core may contain personal information for one or more users including the first user logged in to the OS at the time of the crash), or from a log file capturing one or more activities of the one or more users. For privacy reasons, it is undesirable to send the PII to analysis server 110. According to certain aspects, only non-PII of a user is extracted from the dump file. In some aspects, the crash data is extracted from the dump file such that at least one of email address information, internet protocol address information, media access control information, recent web page information, and screen capture information is excluded from the crash data. In some aspects, extracting the dump file comprises identifying PII of a user from the dump file and verifying that the crash data does not comprise the PII of the user. In some aspects, a unique but anonymous identifier may be sent with the crash data to identify client 102 without revealing PII of the user.

According to certain aspects, crash handler module 104 may collect other suitable information to add to the crash data. For example, the crash data may also be generated based on OS identifying information and/or process identifying information. This information may include parameter and environment information, information regarding the version of the OS that was running when the crash occurred, the specific process that crashed, the time of the crash, and any other suitable information that may be useful for diagnosing the crash.

It may also be desirable from a privacy standpoint to prevent users of the same client from accessing or viewing crash data of one another. According to S206, crash handler module 104 may check if any user was logged in to the OS at the time of the crash. If not, then crash handler module 104 may place any crash data that was generated in global queue 112, which is a queue that is not specific to any one user, but can be used by any user. For example, crash data sent from global queue 112 may be from crashes of non-user specific processes (e.g., system-wide crashes, kernel crashes, etc.).

However, according to S206 and S210, if a user was logged in to the OS at the time of the crash, then crash handler module 104 may store the crash data in a cryptographically secure location that is specific to the user that was logged in to the OS at the time of the crash. For example, the crash data may be encrypted and stored in memory 106. According to certain aspects, each user of client 102 may have a unique directory and keyset that is created from each user's login. The directory may be used as an underlying encrypted storage for the crash data associated with a corresponding user. The keyset may be tied to the corresponding user's login credentials and may be needed to allow the retrieval and storage of information in the directory. The directory may be opened when the corresponding user logs in, and the corresponding user's data within the directory may be locked away once he/she logs out.

For example, with respect to the first user, the first crash data is stored in a cryptographically secure location that is specific to the first user. This cryptographically secure location may prevent other users (different from the first user) from accessing or viewing the first crash data. In some aspects, the cryptographically secure location may be one that allows the first crash data to persist across reboot of the client. In this way, the first crash data may be preserved, especially if other users log in to the OS before the first crash data can be sent to analysis server 110 while the first user is logged in. According to certain aspects, the first crash data is sent to analysis server 110 only when the first user is logged in to the OS. In some aspects, the first crash data may be stored until the first user logs in to the OS and the first crash data is sent to analysis server 110.

According to S212, the crash data may then be placed in a queue that is specific to the user logged in at the time of the crash. Referring to FIG. 1, user-specific queues 108 comprises one or more queues. User-specific queues 108 may comprise the same number of queues as there are users for client 102. Each of these queues is specific to a user. For example, each of these queues may only be used by a corresponding user. In another example, the items contained in a particular queue are associated with a corresponding user. In some aspects, each of these queues is contained within a corresponding cryptographically secure location (e.g., in memory 106) associated with a user. With respect to the first user, the first crash data is placed in a queue that is specific to the first user. This may ensure that the first crash data sent from this queue is only sent when the first user is logged in to the OS.

According to certain aspects, when crash data is generated, crash handler module 104 may determine if the corresponding queue is full before placing the crash data into the corresponding queue. For example, if the crash data is generated when a particular user is logged in, crash handler module 104 may determine if the queue for the user is full before placing data in the queue. If the corresponding queue is not full, then crash handler module 104 may place the crash data into the corresponding queue. Otherwise, crash handler module 104 may attempt to place the crash data into the corresponding queue at a later time or discard the crash data.

Figure 3:
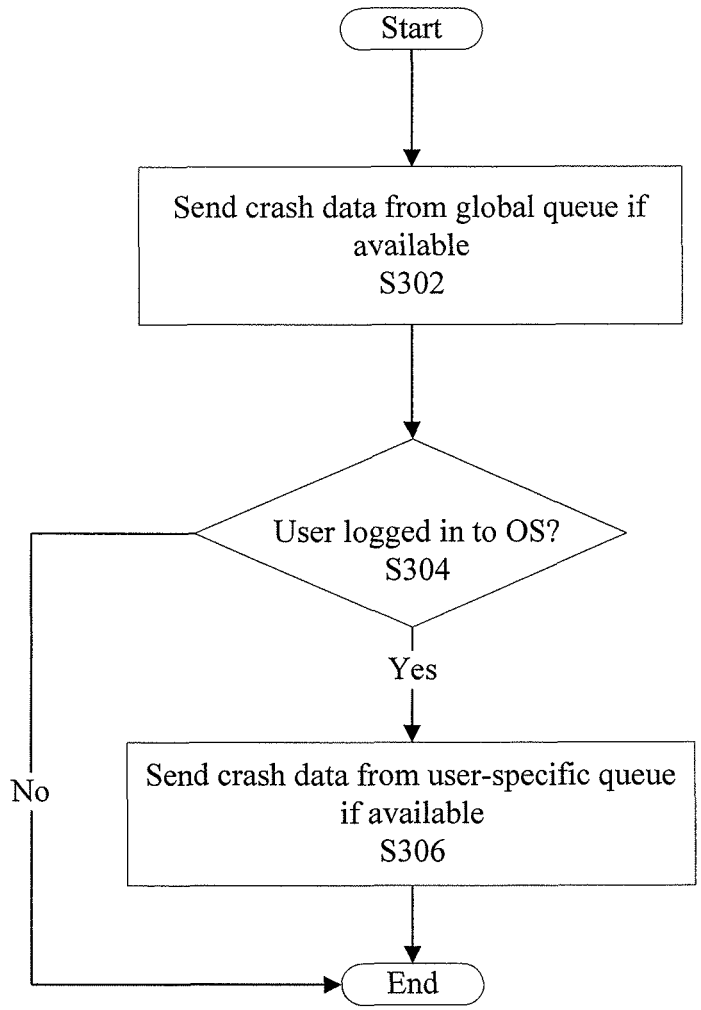
FIG. 3 illustrates another example of a method for handling a crash of a process running on an OS of a client, in accordance with various aspects of the subject technology.

According to certain aspects, crash handler module 104 may manage the transmission of the crash data to analysis server 110. FIG. 3 illustrates an example of a method 300 for handling a crash of a process running on an OS of a client, particularly by managing the transmission of the crash data to analysis server 110. According to S302, on startup of client 102 (e.g., after a reboot of client 102), when a user logs in to the OS, and/or on a periodic time interval (e.g., every hour), crash handler module 104 may send any available crash data (or other suitable items) contained in global queue 112 to analysis server 110.

According to S304, crash handler module 104 may determine whether a user is logged in to the OS at that point in time. If not, then method 300 terminates. If so, then according to S306, any available crash data (or other suitable items) from the queue specific to that user (e.g., from user-specific queues 108) may be sent to analysis server 110. For example, the first crash data in the queue that is specific to the first user is only sent to analysis server 110 when the first user is logged in. This prevents the first crash data from being sent to analysis server 110 when other users are logged in. For example, when a second user different from the first user is logged in to the OS and connection to analysis server 110 is available, crash handler module 104 does not take steps to send the first crash data associated with the first user to analysis server 110. Rather, crash handler module 104 may send any available crash data associated with the second user to analysis server 110.

According to certain aspects, crash handler module 104 may check whether network connection to analysis server 110 is available before the crash data is sent. If the network connection is available, then crash handler module 104 may send the crash data to analysis server 110. If the transmission of the crash data fails, crash handler module 104 may retry sending the crash data for a suitable number of attempts. If the transmission continues to fail, then the crash data may remain stored in memory 106 and in the queue specific to the corresponding user so that crash handler module 104 may send the crash data at a later time. According to certain aspects, rate limiting may be used to limit the number of times crash data is sent to analysis server 110 in order to avoid flooding analysis server 110. In some aspects, crash handler module 104 may determine whether a particular user has rescinded his/her consent to report the crash to analysis server 110. In this situation, crash handler module 104 does not send the crash data, but rather discards the crash data.

According to certain aspects, methods 200 and 300 allow the crash data to be sent to analysis server 110 only when a corresponding user is logged in to the OS. Otherwise, the crash data remains stored in a cryptographically secure location such that other users may not access or view the crash data. Handling the crash in this manner provides additional security and protects the privacy of a user.

In some aspects, methods 200 and 300 may be implemented to handle a crash of any suitable process running on OS, such as a user space process. In some aspects, methods are provided for handling crashes of a kernel process. When a crash to the kernel process occurs, a dump file generated may include kernel debug buffer information and/or other information associated with the memory activity of client 102 before the crash occurred. As a result of the kernel process crash, client 102 is rebooted. In some aspects, the dump file may be stored such that it persists across reboot of client 012 (e.g., in memory 106 or some other suitable location). On startup, crash handler module 104 may search for the dump file, and if found, may generate crash data based on the dump file. In addition to any of the methods described above, crash handler module 104 may generate the crash data by extracting the kernel debug buffer information from the stored dump file, analyzing the kernel debug buffer information for stack traces that signify the cause of the crash, and generating a hash/fingerprint of the stack in order to group similar kinds of crashes. This crash data may be sent to analysis server 110 using any of the methods described above.

Although the subject technology has been described with respect to crash data, the subject technology may be applied in reporting other suitable types of data to a server where it is beneficial to protect the identity of individual users. For example, usage statistics of the OS and/or applications running on the OS, crash statistics, and other kinds of data may be sent to a server using any of the methods described above.

Figure 4:
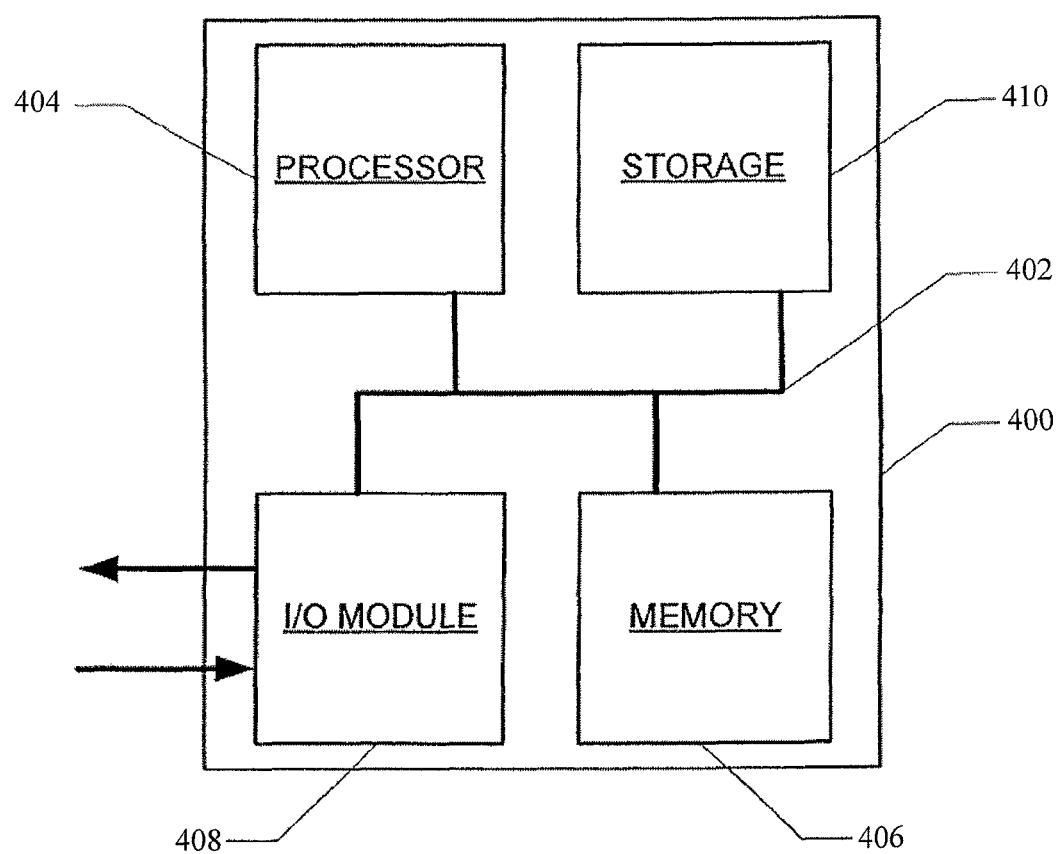
FIG. 4 is a block diagram illustrating components of a controller, in accordance with various aspects of the subject technology.

FIG. 4 is a block diagram illustrating components of controller 400, in accordance with various aspects of the subject technology. Controller 400 comprises processor module 404, storage module 410, input/output (I/O) module 408, memory module 406, and bus 402. Bus 402 may be any suitable communication mechanism for communicating information. Processor module 404, storage module 410, I/O module 408, and memory module 406 are coupled with bus 402 for communicating information between any of the modules of controller 400 and/or information between any module of controller 400 and a device external to controller 400. For example, information communicated between any of the modules of controller 400 may include instructions and/or data. In some aspects, bus 402 may be a universal serial bus. In some aspects, bus 402 may provide Ethernet connectivity.

In some aspects, processor module 404 may comprise one or more processors, where each processor may perform different functions or execute different instructions and/or processes. For example, one or more processors may execute instructions for handling a crash of a process running on an operating system (OS) of a client, and one or more processors may execute instructions for input/output functions.

Memory module 406 may be random access memory ("RAM") or other dynamic storage devices for storing information and instructions to be executed by processor module 404. Memory module 406 may also be used for storing temporary variables or other intermediate information during execution of instructions by processor 404. In some aspects, memory module 406 may comprise battery-powered static RAM, which stores information without requiring power to maintain the stored information. Storage module 410 may be a magnetic disk or optical disk and may also store information and instructions. In some aspects, storage module 410 may comprise hard disk storage or electronic memory storage (e.g., flash memory). In some aspects, memory module 406 and storage module 410 are both a machine-readable medium.

Controller 400 is coupled via I/O module 408 to a user interface for providing information to and receiving information from an operator implementing methods 200 and/or 300. For example, the user interface may be a cathode ray tube ("CRT") or LCD monitor for displaying information to an operator. The user interface may also include, for example, a keyboard or a mouse coupled to controller 400 via I/O module 408 for communicating information and command selections to processor module 404.

According to various aspects of the subject disclosure, methods described herein are executed by controller 400. Specifically, processor module 404 executes one or more sequences of instructions contained in memory module 406 and/or storage module 410. In one example, instructions may be read into memory module 406 from another machine-readable medium, such as storage module 410. In another example, instructions may be read directly into memory module 406 from I/O module 408, for example from an operator implementing methods 200 and/or 300 via the user interface. Execution of the sequences of instructions contained in memory module 406 and/or storage module 410 causes processor module 404 to perform methods for handling a crash of a process running on an OS of a client. For example, a computational algorithm for handling a crash of a process running on an OS of a client may be stored in memory module 406 and/or storage module 410 as one or more sequences of instructions. Information such as the dump file and the crash data may be communicated from processor module 404 to memory module 406 and/or storage module 410 via bus 402 for storage. In some aspects, the information may be communicated from processor module 404, memory module 406, and/or storage module 410 to I/O module 408 via bus 402. The information may then be communicated from I/O module 408 to an operator implementing methods 200 and/or 300 via the user interface.

One or more processors in a multi-processing arrangement may also be employed to execute the sequences of instructions contained in memory module 406 and/or storage module 410. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 404 for execution. Such a medium may take many forms, including, but not limited to, non-volatile media, and volatile media. Non-volatile media include, for example, optical or magnetic disks, such as storage module 410. Volatile media include dynamic memory, such as memory module 406. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method for handling a crash of a process running on an operating system (OS) of a client, the method comprising:
   generating crash data based on a dump file associated with the crash of the process, wherein the crash data is associated with a first user logged into the OS at a time of the crash;
   storing the crash data in a cryptographically secure location on the client such that the crash data persists across reboot of the client; and
   preventing the crash data from being sent to an analysis server when the first user is not logged into the OS,
   wherein the preventing comprises placing the crash data in a queue, including items to be sent to the analysis server, only when the first user is logged into the OS.

2. The method of claim 1, wherein the crash data is generated based on information associated with at least one of the OS and the process.

3. The method of claim 1, wherein the generating the crash data comprises extracting the crash data from the dump file.

4. The method of claim 1, wherein the crash data comprises at least one of state information of the OS at the time of the crash, state information of the process at the time of the crash, stack trace information, OS identifying information, process identifying information, and application log information associated with the crash.

5. The method of claim 3, wherein only non-personal identifiable information of the first user is extracted from the dump file.

6. The method of claim 3, wherein the crash data is extracted from the dump file such that at least one of email address information, internet protocol address information, media access control information, recent web page information, and screen capture information is excluded from the crash data.

7. The method of claim 3, wherein the extracting comprises:
   identifying personal identifiable information of the first user from the dump file; and
   verifying that the crash data does not comprise the personal identifiable information of the first user.

8. The method of claim 7, wherein the personal identifiable information comprises at least one of email address information, internet protocol address information, media access control information, recent web page information, and screen capture information.

9. The method of claim 1, wherein a size of the crash data is less than 1% of a size of the dump file.

10. The method of claim 1, wherein the crash data is prevented from being sent to the analysis server when a second user different from the first user is logged into the OS and connection to the analysis server is available.

11. The method of claim 1, further comprising:
   determining if a queue, including items to be sent to the analysis server, is full; and
   placing the crash data in the queue if the queue is not full.

12. The method of claim 11, wherein the queue is specific to the first user.

13. The method of claim 1, wherein the queue is specific to the first user.

14. The method of claim 1, wherein the preventing comprises sending the crash data to the analysis server only when the first user is logged into the OS and connection to the analysis server is available.

15. A system for handling a crash of a process running on an operating system (OS) of a client, the system comprising:
   a processor; and
   a crash handler module configured to generate, via the processor, crash data based on a dump file associated with the crash of the process, the crash data being associated with a first user logged into the OS at a time of the crash,
   wherein the crash handler module is configured to store the crash data in a cryptographically secure location on the client such that the crash data persists across reboot of the client,
   wherein the crash handler module is configured to prevent the crash data from being sent to an analysis server when the first user is not logged into the OS, and
   wherein the preventing comprises placing the crash data in a queue, including items to be sent to the analysis server, only when the first user is logged into the OS.

16. The system of claim 15, wherein the crash handler module is configured to extract the crash data from the dump file such that at least one of email address information, internet protocol address information, media access control information, recent web page information, and screen capture information is excluded from the crash data.

17. The system of claim 15, wherein the crash handler module is configured to prevent the crash data from being sent to the analysis server when a second user different from the first user is logged into the OS and connection to the analysis server is available.

18. A method for handling a crash of a process running on an operating system (OS) of a client, the method comprising:
   extracting crash data from a dump file associated with the crash of the process, wherein the crash data is associated with a first user logged into the OS at a time of the crash, wherein the crash data is extracted from the dump file such that at least one of email address information, internet protocol address information, media access control information, recent web page information, and screen capture information is excluded from the crash data, and wherein a size of the crash data is less than 1% of a size of the dump file;
   storing the crash data in a cryptographically secure location on the client such that the crash data persists across reboot of the client; and
   preventing the crash data from being sent to an analysis server when the first user is not logged into the OS, and when a second user different from the first user is logged into the OS and connection to the analysis server is available.

19. The method of claim 18, wherein the preventing comprises sending the crash data to the analysis server only when the first user is logged into the OS and connection to the analysis server is available.

20. A system for handling a crash of a process running on an operating system (OS) of a client, the system comprising:
   a processor; and
   a crash handler module configured to generate, via the processor, crash data based on a dump file associated with the crash of the process, the crash data being associated with a first user logged into the OS at a time of the crash, a size of the crash data being less than 1% of a size of the dump file,
   wherein the crash handler module is configured to store the crash data in a cryptographically secure location on the client such that the crash data persists across reboot of the client, and wherein the crash handler module is configured to prevent the crash data from being sent to an analysis server when the first user is not logged into the OS.

21. The system of claim 20, wherein the crash handler module is configured to extract the crash data from the dump file such that at least one of email address information, internet protocol address information, media access control information, recent web page information, and screen capture information is excluded from the crash data.

22. The system of claim 20, wherein the preventing comprises placing the crash data in a queue, including items to be sent to the analysis server, only when the first user is logged into the OS.

23. A non-transitory machine-readable medium encoded with instructions for a method of handling a crash of a process running on an operating system (OS) of a client, the method comprising:
   generating crash data based on a dump file associated with the crash of the process, wherein the crash data is associated with a first user logged into the OS at a time of the crash, and wherein a size of the crash data is less than 1% of a size of the dump file;
   storing the crash data in a cryptographically secure location on the client such that the crash data persists across reboot of the client; and
   preventing the crash data from being sent to an analysis server when the first user is not logged into the OS.

24. The non-transitory machine-readable medium of claim 23, wherein the crash data is prevented from being sent to the analysis server when a second user different from the first user is logged into the OS and connection to the analysis server is available.

25. The non-transitory machine-readable medium of claim 23, wherein the generating the crash data comprises extracting only non-personal identifiable information of the first user from the dump file.

26. A non-transitory machine-readable medium encoded with instructions for a method of handling a crash of a process running on an operating system (OS) of a client, the method comprising:
   generating crash data based on a dump file associated with the crash of the process, wherein the crash data is associated with a first user logged into the OS at the time of the crash;
   storing the crash data in a cryptographically secure location on the client such that the crash data persists across reboot of the client; and
   preventing the crash data from being sent to an analysis server when the first user is not logged into the OS,
   wherein the preventing comprises placing the crash data in a queue, including items to be sent to the analysis server, only when the first user is logged into the OS.

27. The non-transitory machine-readable medium of claim 26, wherein the generating the crash data comprises extracting only non-personal identifiable information of the first user from the dump file.

28. The non-transitory machine-readable medium of claim 26, wherein a size of the crash data is less than 1% of a size of the dump file.

* * * * *